(12) United States Patent
Chandran et al.

(10) Patent No.: US 7,555,443 B2
(45) Date of Patent: Jun. 30, 2009

(54) METHOD FOR FINANCING OWNERSHIP OF A VEHICLE

(75) Inventors: Anand Chandran, Aliso Viejo, CA (US); Kirk Zumhoff, Highland, MI (US); Mark Kaczynski, Canton, MI (US); Robert Earl Pence, Goodrich, MI (US); Bob H. Reith, Grosse Pointe Woods, MI (US)

(73) Assignee: Ford Motor Company, Dearborn, MI (US)

( * ) Notice: Subject to any disclaimer, the term of this patent is extended or adjusted under 35 U.S.C. 154(b) by 1155 days.

(21) Appl. No.: 10/248,557

(22) Filed: Jan. 29, 2003

(65) Prior Publication Data

US 2003/0172016 A1 Sep. 11, 2003

Related U.S. Application Data

(60) Provisional application No. 60/362,406, filed on Mar. 7, 2002.

(51) Int. Cl.
*G07B 17/00* (2006.01)
(52) U.S. Cl. .................. 705/10; 705/35; 705/1
(58) Field of Classification Search ............ None
See application file for complete search history.

(56) References Cited

U.S. PATENT DOCUMENTS

| | | | |
|---|---|---|---|
| 4,736,294 A | 4/1988 | Gill et al. | |
| 5,704,045 A | 12/1997 | King et al. | |
| 5,774,883 A | 6/1998 | Anderson et al. | |
| 6,148,293 A | 11/2000 | King | |
| 6,345,262 B1 | 2/2002 | Madden | |
| 6,622,129 B1 * | 9/2003 | Whitworth | 705/37 |
| 7,089,503 B1 * | 8/2006 | Bloomquist et al. | 715/780 |
| 2001/0034700 A1 | 10/2001 | Foss et al. | |
| 2002/0010643 A1 | 1/2002 | Chaves | |

FOREIGN PATENT DOCUMENTS

WO WO 01/93163 A2 12/2001

* cited by examiner

*Primary Examiner*—Michael J. Fisher
(74) *Attorney, Agent, or Firm*—Gary A. Smith; Brooks Kushman P.C.

(57) ABSTRACT

The present invention relates to a method for financing ownership of a vehicle by a customer. A preferred method of the present invention includes financing the purchase of a vehicle with a RIC or loan. The RIC or loan is preferably repaid with a set of first payments followed by a set of second payments. The first payments preferably last until a decision point and are about 10 percent to about 40 percent lower than the second payments. The preferred method embodiment includes contacting the customer prior to the decision point to promote trade-in of the vehicle and a new vehicle purchase.

23 Claims, 1 Drawing Sheet

METHOD FOR FINANCING OWNERSHIP OF A VEHICLE

CROSS REFERENCE TO RELATED APPLICATIONS

This application claims the benefit of U.S. provisional application Ser. No. 60/362,406, filed Mar. 7, 2002, entitled "An Automotive Finance Process That Provides The Low Customer Payments And Customer Trade Cycle Management Features Of A Lease Without The Residual Exposure".

BACKGROUND OF INVENTION

1. Field of the Invention

At least one aspect of the present invention generally relates to methods for financing ownership of a vehicle.

2. Background Art

In a typical vehicle leasing arrangement between a vehicle manufacturer and a vehicle customer, a vehicle dealership supplies the vehicle to the vehicle customer and the vehicle leasing company retains ownership of the vehicle. At the end of the lease term, the vehicle customer usually has two options: (1) the vehicle customer can return the vehicle to the vehicle dealership (which in general is returned to the vehicle leasing company), (2) the vehicle customer can purchase the vehicle for the purchase option price.

Under typical leasing agreement terms, the vehicle customer has the first option to purchase the vehicle. In turn, if the customer decides not to purchase the vehicle, the dealership can purchase it from the vehicle leasing company. If the LEV is less than the market value, the customer or dealership usually purchases the vehicle to preserve the equity in the vehicle or turn a profit (if the vehicle is sold) equal to the difference between the LEV and the market value. If the LEV is greater than the market value, the customer and dealer passes on their option and the vehicle leasing company remains the owner of the vehicle. Consequently, the vehicle leasing company absorbs a loss equal to the difference between the LEV and the market selling price. This problem is commonly referred to as the residual loss problem.

Vehicle ownership plans financed by a finance company, bank or other financing institution can avoid the residual loss problem associated with typical leasing arrangements. Under a typical vehicle ownership plan with an indirect finance company, the vehicle customer purchases the vehicle from a dealer and enters into a retail installment contract (RIC) (a contract which evidences the purchase of the vehicle on credit over time) with that dealer. The dealer then assigns that RIC to the finance company. Under a typical ownership plan with a direct finance company or bank, the customer obtains a loan from the bank or other finance company and uses that loan to purchase a vehicle from a dealer. In such case, the finance company, bank or other financial institution would not have the residual loss responsibility since it does not own the vehicle.

Vehicle ownership plans may not fit all of a vehicle customer's concerns. In recent times, vehicle customers are generally motivated by lower monthly payments and vehicle ownership. Leasing is generally recognized as the primary tool to deliver low monthly payments. On the other hand, vehicle ownership plans typically require substantially higher payments at similar terms.

To align the vehicle customer's concerns of low payments and ownership, automotive companies have created alternatives to typical leasing programs and vehicle ownership plans.

For example, Mazda Motor Company has offered the "Progressive Payment Plan". The vehicle customer purchases a vehicle from a Mazda dealer on a RIC which is assigned to Mazda American Credit. The customer then makes monthly payments to Mazda American Credit in order to pay off the RIC. According to the "Progressive Payment Plan", Mazda Motor Company pays half of the monthly payment for six months and pays a quarter of the monthly payment for the next six months.

Although this program and similar programs offer low initial payments and ownership, these programs do not address trade cycle management. Trade cycle management is the practice of promoting vehicle trade-in and purchase of a new vehicle. As a result, there exists a need to provide a method for financing ownership of a vehicle with a RIC or a loan having a RIC or loan term which offers low initial payments and vehicle ownership while promoting vehicle trade-in and purchase of a new vehicle by providing a decision point, which is at or about the midpoint of the RIC or loan term.

SUMMARY OF INVENTION

The present invention relates to a method for financing ownership of a vehicle. One object of the present invention is to provide a method for financing ownership which promotes trade-in and purchase of a new vehicle by providing a decision point. Another object of the present invention is to provide a method for financing ownership of a vehicle which avoids the residual loss problem. Yet another object of the present invention is to provide a method for financing ownership that minimizes promotional costs to enhance customer loyalty. Another object of the present invention is to provide a method for financing ownership that addresses trade cycle management.

A preferred method embodiment of the present invention includes financing the purchase of a vehicle with a RIC or loan. The RIC or loan is preferably repaid with a set of first payments followed by a set of second payments. The first payments preferably last until a decision point and are about 10 percent to about 40 percent lower than the second payments. The preferred method embodiment includes contacting the customer prior to the decision point to promote trade-in and new vehicle purchase. The customer can avoid a substantial number of second payments by trading in their current vehicle and purchasing a new vehicle.

To provide the first and second payment levels, the first term portion (in which first payments are made) can amortize over a period longer than the second term portion (in which second payments are made) amortizes. Alternatively, a vehicle customer can receive a rebate that can be applied to each first payment. Additionally, the first payments can have a first interest rate and the second payments can have a second interest rate. The first interest rate can be lower than the second interest rate to provide lower first payments.

The first and second payments can be monthly. The amount financed can be decreased by a down payment. The RIC or loan can have a term between about 36 months and about 84 months.

According to one preferred method of the present invention, a RIC or loan can be provided for the purchase of a new vehicle. The new vehicle RIC or loan can be repaid with a set of first payments followed by a set of second payments. The first payments can last until a decision point and can be about 10, percent to about 40, percent lower than the second payments.

The above objects and other objects, features and advantages of the present invention are readily apparent from the following detailed description of the best mode for carrying out the invention when taken in connection with the accompanying drawings.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawing which:

DETAILED DESCRIPTION

Figure 1:
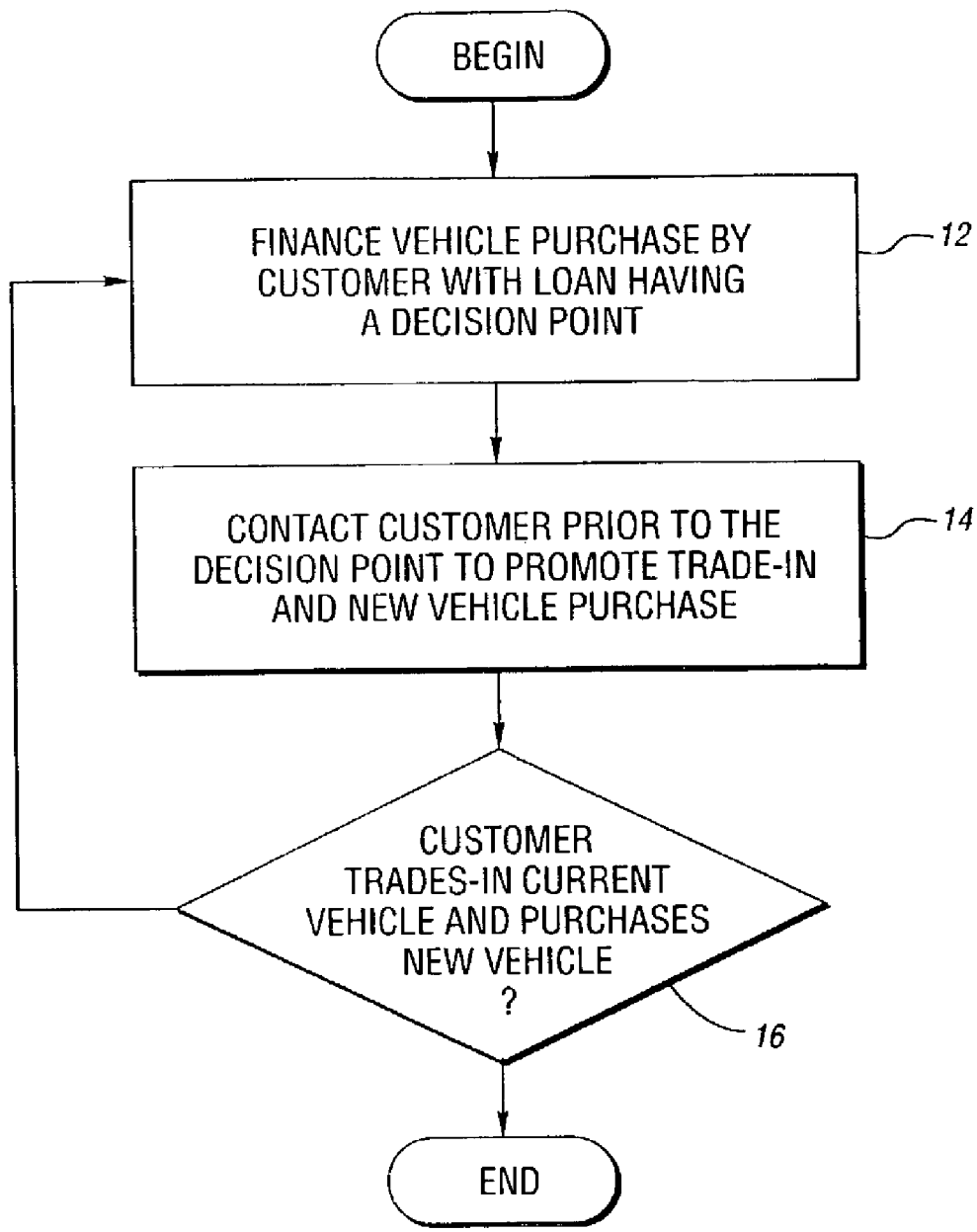
FIG. 1 is a block flow diagram illustrating a preferred embodiment of a method for implementing the present invention.

As required, detailed embodiments of the present invention are disclosed herein. However, it is to be understood that the disclosed embodiments are merely exemplary of the invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

A preferred method of practicing the present invention includes two basic steps: (a) financing the purchase of a vehicle with a RIC or loan repaid with a set of first payments followed by a set of second payments, and (b) contacting the customer prior to the decision point to promote trade-in of the vehicle and new vehicle purchase. The first payments last until a decision point and are about 10 percent to about 40 percent lower than the second payments. The customer can avoid at least a substantial number of the second payments by trading in the vehicle and purchasing a new vehicle.

FIG. 1 is a schematic diagram illustrating a preferred methodology for implementing the present invention. As represented in block 12, the purchase of a vehicle is financed with a RIC or loan having a decision point.

The decision point is preferably provided by structuring the repayment of the RIC or loan with a set of first payments and a set of second payments. The decision point preferably marks the point during the RIC or loan repayment period in which the loan payment switches from the first payment to the second payment. The level of the first and second payments can be dependent upon a number of considerations, including, but not limited to, providing a lower first payment to encourage the initial purchase of the vehicle and providing a higher second payment to promote trade-in and new vehicle purchase.

The first and second payments are preferably made by the vehicle customer on a periodic basis, most preferably a monthly basis. However, it should be understood that the first and/or second payments can be made by the customer on a weekly, biweekly or semi-monthly basis to best fit a particular implementation of the present invention. It should also be understood that the amount financed can be decreased by a down payment or vehicle trade-in made by the vehicle customer. The RIC or loan term can be from about 36 months to about 84 months to best fit a particular implementation of the present invention.

In accord with a preferred embodiment, the first payments are about 10 percent to about 40 percent lower than the second payments. The first payments provide the customer with low initial payments typical of a vehicle lease arrangement and the benefits of vehicle ownership. Moreover, the prospect of the higher second payments may reduce customer sticker shock as they shop for a new vehicle.

Additionally, the customer has a different expectation of the payment level at the decision point relative to the end of a typical leasing arrangement. The customer's expectation under the financing methods of the present invention is that the payment level will increase about 10 to about 40 percent after the decision point. With respect to a typical leasing arrangement, the customer expects that the payment level on a new lease vehicle will be comparable to the existing payment. Faced with the prospect of a higher payment under the present invention, the customer will be pleased if they can trade in their vehicle for a new vehicle with payments equivalent to the second payment level of their existing vehicle RIC or loan. On the other hand, a lease vehicle customer may experience sticker shock as they re-lease.

There are at least four different techniques that can be used individually or in combination to provide the set of first payments followed by the set of second payments. It should be understood that these techniques can be implemented using a computer system, computer software and/or computer application. Preferably, the computer system is a hand-held calculator that can be utilized by a dealership representative to estimate at least the first and second payment levels during negotiations with a vehicle customer.

One technique includes writing the first portion of the RIC or loan term in which the customer makes the first payments for a longer amount of time than the second portion of the RIC or loan term in which the customer makes the second payments. As a non-limiting example, the first portion of the RIC or loan can amortize at about 6 years (72 months), and the second portion of the RIC or loan can amortize at about 3 years (36 months).

Another technique includes utilizing the same interest rate and different payment amount of the first and second payments. As a non-limiting example, the first portion of the RIC or loan (first 36 months of a 66 month RIC or loan) can have monthly payments set lower than a comparable 60 month RIC or loan. The second portion can have monthly payments adequate to fully amortize the remaining principal balance over the remaining 30 months. A preferred implementation of this technique includes programming a hand-held computer or software application downloaded into the dealer's computer system to compute the first and second payment levels based on a financing amount, an interest rate, the decision point and the term of repayment. For example, the financing amount can be $15,000.00, the interest rate can be 5.90 percent APR, the decision point can be at 36 months, and the term of repayment can be 66 months. Accordingly, the first payment level can be computed by using the 5.90 percent APR amortized over 60 months and multiplied by 0.85 (to provide the lower payment). Using this formula, the first payment level is $245.90 for the first 36 months of the RIC or loan. The second payment level can be computed by fully amortizing the remaining principal balance after the first payments end over the remaining term of the RIC or loan, i.e., 30 months. Using this formula, the second payment level is $268.69. It should be understood that the input values, i.e., financing amount, interest rate, decision point, and loan term can be adjusted individually or in combination to best fit a particular implementation of the present invention. For example, the vehicle customer may want the dealership representative to provide payment levels for a variety of different cars or down payment levels.

Yet another technique includes issuing a rebate for the first portion of the RIC or loan. As a non-limiting example, a $30 monthly rebate can be given to the customer for the first 36 months of a 72 month RIC or loan.

Alternatively, the first payments can have a first interest rate that is lower than a second interest rate which is applied to the second payments.

The estimated equity point of the RIC or loan is considered in determining the decision point. The equity point refers to the point during the repayment term in which the amount owed is substantially equivalent to the value of the vehicle. At the equity point, the vehicle owner can sell their vehicle and use the proceeds to pay off the amount owed. Alternatively, the vehicle owner can trade in their vehicle to a dealership. In this case, the amount owed is paid off by the dealer so that the customer can enter into a new lease or vehicle purchase without an outstanding balance on the RIC or loan.

It should be understood that the equity point varies with the payment amount, deprecation rate of a vehicle, and the down payment. Generally, the slower the depreciation rate or the higher the down payment, the sooner the equity point will be reached. The methods of the present invention can be utilized with vehicles that have relatively low or high depreciation or when the customer considerably lowers the amount financed with a significant down payment or when the vehicle is purchased with no down payment.

Some customers may be in a slightly negative equity position (otherwise referred to as the GAP) at the decision point, i.e., the customer owes more money than the vehicle is worth when it is sold to the dealer and the RIC or loan is paid off by the dealer. If the customer decides to trade in his vehicle for a new vehicle, the vehicle manufacturer can pay a portion of the GAP to the finance company as an incentive to the customer for purchasing a new vehicle from the same vehicle manufacturer. It should be understood that the GAP costs represent a real cost associated with the customer selling their vehicle and purchasing a new vehicle. Preferably, an optimum mix is achieved which offers low first payments to encourage purchase while promoting high customer loyalty by paying part of the trade-in GAP.

As represented in block 14, the customer is contacted prior to the RIC or loan reaching the decision point to promote trade-in and new vehicle purchase. The customer is preferably contacted by a dealership representative or the finance company (or vendor working on their behalf). The information relating to the customer's RIC or loan, most particularly the decision point, can be stored in a computer database. Preferably, the dealership representative can access the computer database in order to identify vehicle customers that have RIC or loans that are near the decision point. Alternatively, the computer database can be linked to an application that can alert the dealership representative of vehicle customers that are near the decision point, i.e., through an e-mail notification. Other RIC or loan information, i.e., first and second payment levels, can also be stored in the computer database for dealership representative retrieval and use during customer contact.

It should be understood that the customer can be contacted, for example, by conventional mail, electronic mail or telephone. It should also be understood that contact can also be made after the decision point to best fit implementation of the present invention. The customer can be notified that at least a portion of GAP costs can be avoided and at least a portion of the higher second payments can be avoided by trading in the current vehicle and purchasing a new vehicle. The RIC or loan payment for the new vehicle can be advertised as being the same or lower than the current low first payment. In some cases, the customer can also be reminded that the primary warranty for the vehicle may be ending.

Armed with this information, the vehicle customer is in a better position to evaluate trading in their vehicle for a new vehicle, as depicted in decision block 16. Preferably, the new vehicle is financed using the methods of the present invention, i.e., uneven payment streams with a decision point. From a dealership's perspective, if the vehicle customer does trade in their vehicle, the trade cycle is improved relative to a standard vehicle RIC or loan. From a vehicle manufacturer's perspective, the majority of marketing costs can be directed at the first portion of the loan term rather than the full length of the RIC or loan term. Not all customers may feel they are in a position to trade or make the higher second payments. As an alternative to trade-in or new vehicle purchase, the finance company, bank or other financial institution can offer refinancing so that the vehicle customer can lower their payment by extending the term of the RIC or loan.

Accordingly, the present invention can be implemented in the following non-limiting example. A customer can purchase Vehicle A without a down payment. For purposes of the example, Vehicle A can retail at $14,795 MSRP with an estimated residual value of 60 percent after 24 months, 53 percent after 36 months and 50 percent after 41 months. The set of first payments can be set at a level to amortize in 72 months, i.e., $272 per month at 9.75. Accordingly, the equity point is reached approximately after about 42 monthly payments. The decision point can be set at month 40. At the decision point, the first payments end and the second payments begin. The second payments can be $295 per month, or $25 more per month than the first payments. It should be understood that the increase can be more or less than $25 as long as the amount is high enough to motivate a customer to trade in, but not so high as to deter the customer from considering the methods of the present invention.

Prior to the decision point at 40 months, preferably between months 34 and 40, the customer can be reminded of the impending payment increase with a telephone call, via conventional mail or via e-mail. However, it is understood that contact can be made after the decision point and in such case the portion of switching costs avoided may be adjusted downward relative to trade-in and new vehicle purchase prior to the decision point. If the elevation in monthly payments does not serve as adequate motivation for the customer to trade in, then the manufacturer may offer a renewal incentive designed to cover all or some of the potential GAP costs. During the same contact, the customer can also be notified that financing is available for the purchase of a new vehicle with a competitive payment. This offer would appeal to many vehicle customers, especially if they value low payments and/or ownership of a new vehicle.

While the best mode for carrying out the invention has been described in detail, those familiar with the art to which this invention relates will recognize various alternative designs and embodiments for practicing the invention as defined by the following claims.

What is claimed:

1. A method for financing ownership of a vehicle by a customer, the method comprising:

financing the purchase and ownership of the vehicle by a customer with a RIC or loan of an amount financed at or before inception of the purchase of the vehicle;

at or before inception of the purchase of the vehicle, determining a first payment amount for each of a plurality of first payments to occur before a decision point and a second payment amount for each of a plurality of second payments to occur after the decision point, the first payment amount being a predetermined percent lower than the second payment amount;

receiving repayment of the amount financed with one or more of the plurality of first payments; and contacting the customer based on the decision point to promote trade-in of the vehicle and new vehicle purchase, the customer avoids one or more of the plurality of the second payments and the step of receiving repayment is discontinued prior to the expiration of the RIC or loan by the customer relinquishing ownership of the vehicle and purchasing a new vehicle.

2. The method of claim 1 wherein the step of receiving repayment continues until the expiration of the RIC or loan unless the customer relinquishes ownership of the vehicle.

3. The method of claim 1 wherein the step of determining the decision point comprises determining the decision point based at least partially on the value of the RIC or loan over at least a portion of the term of the RIC or loan.

4. The method of claim 1 wherein the first payments and second payments are weekly, biweekly, semi monthly or monthly.

5. The method of claim 1 wherein the step of contacting the customer occurs after the decision point.

6. The method of claim 1 wherein the RIC or loan has a term of between about 36 months and about 84 months.

7. The method of claim 1 wherein the step of contacting the customer occurs before the decision point.

8. The method of claim 1 further comprising providing a RIC or loan for the purchase of the new vehicle if the vehicle customer chooses trade-in and new vehicle purchase.

9. The method of claim 8 wherein the new vehicle RIC or loan is repaid with a plurality of first payments followed by a plurality of second payments, the first payments lasting until a decision point and being about 10 percent to about 40 percent lower than the second payments.

10. The method of claim 6 wherein the first payments are made for a first term portion of the RIC or loan term and the second payments are made for a second term portion of the RIC or loan term, the first term portion amortizes over a period longer than the second term portion amortizes.

11. The method of claim 1 wherein the first payments have a first interest rate and the second payments have a second interest rate.

12. The method of claim 11 wherein the first interest rate is lower than the second interest rate.

13. A method for financing ownership of a vehicle by a customer, the method comprising:

financing the purchase and ownership of the vehicle by a customer with a RIC or loan of an amount financed at or before inception of the purchase of the vehicle, at or before inception of the purchase of the vehicle, determining a first payment amount for each of a plurality of first payments to occur before a decision point and a second payment amount for each of a plurality of second payments to occur after the decision point, the first payment amount being a predetermined percent lower than the second payment amount;

receiving repayment of the amount financed with one or more of the plurality of first payments; and contacting the customer based on the decision point to advertise trade-in of the vehicle and new vehicle purchase, the customer receiving a rebate applicable to at least a portion of the GAP existing on the vehicle at the time of the trade-in by trading in the vehicle, the customer thereby relinquishing ownership of the vehicle, and purchasing the new vehicle.

14. The method of claim 13 wherein the first payments are about 10 percent to about 40 percent lower than the second payments.

15. The method of claim 13 wherein the first payments have a first interest rate and the second payments have a second interest rate.

16. The method of claim 15 wherein the first interest rate is lower than the second interest rate.

17. The method of claim 13 wherein the step of receiving repayment is discontinued prior to the expiration of the RIC or loan by trading in the vehicle and purchasing the new vehicle.

18. The method of claim 13 wherein the RIC or loan has a term of between about 36 months and about 84 months.

19. The method of claim 13 wherein the first payments and second payments are periodic.

20. A method for financing ownership of a vehicle by a customer, the method comprising:

financing the purchase and ownership of a first vehicle by a customer with a RIC or loan of an amount financed at or before inception of the purchase of the first vehicle;

at or before inception of the purchase of the vehicle, determining a first payment amount for each of a plurality of first payments to occur before a decision point and a second payment amount for each of a plurality of second payments to occur after the decision point, the first payment amount being a predetermined percent lower than the second payment amount;

receiving repayment of the amount financed with one or more of the plurality of first payments; and contacting the customer based on the decision point to promote trade-in of the first vehicle, the customer avoids one or more of the plurality of second payments and the step of receiving repayment is discontinued prior to the expiration of the RIC or loan by the customer relinquishing ownership of the vehicle.

21. The method of claim 20, wherein the contacting step further includes contacting the customer based on the decision point to promote trade-in of the first vehicle and purchase of a second vehicle.

22. The method of claim 20, wherein the contacting step further includes contacting the customer based on the decision point to promote trade-in of the first vehicle and lease of a second vehicle.

23. The method of claim 20, wherein the customer relinquishing ownership of the vehicle includes the customer trading-in the vehicle.

* * * * *